Feb. 6, 1934.　　F. K. MURPHY ET AL　　1,946,175
WATER INDICATOR
Filed Dec. 28, 1928　　2 Sheets-Sheet 1

Feb. 6, 1934.  F. K. MURPHY ET AL  1,946,175
WATER INDICATOR
Filed Dec. 28, 1928    2 Sheets-Sheet 2
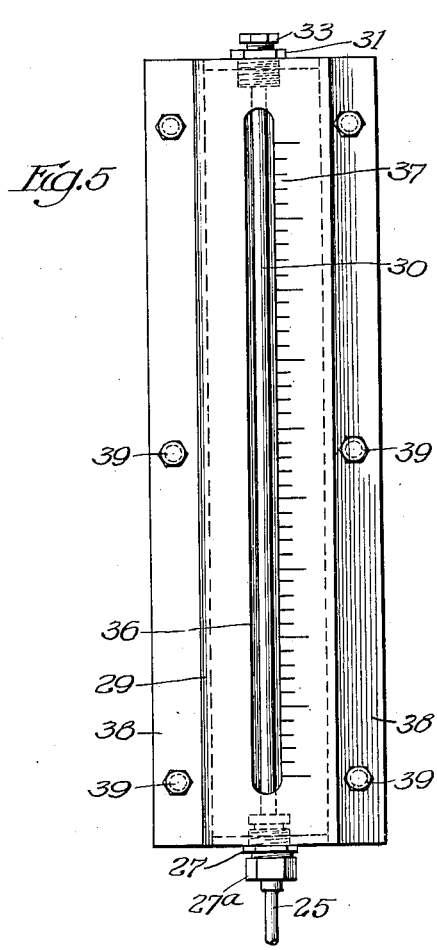
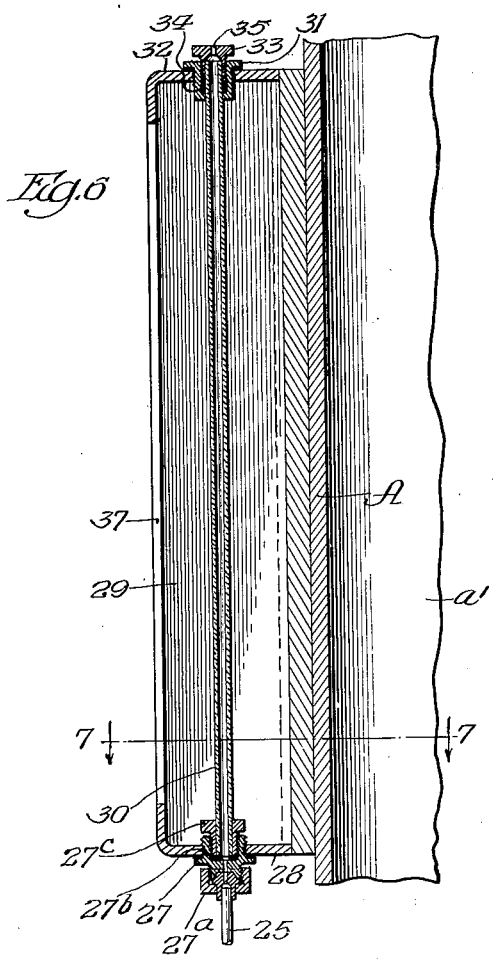
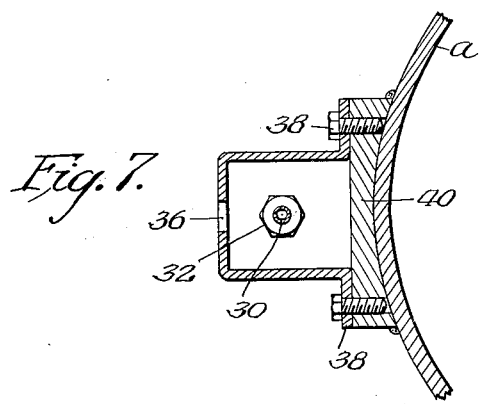

Patented Feb. 6, 1934

1,946,175

UNITED STATES PATENT OFFICE 1,946,175

WATER INDICATOR

Fred. K. Murphy, Raymond W. Retterer, and Frank K. Mitchell, Indianapolis, Ind.

Application December 28, 1928
Serial No. 328,950

1 Claim. (Cl. 73—54)

The invention relates to devices for indicating the volume of water in tanks, such as those on locomotive tenders.

One object of the invention is to provide an indicator for the water in locomotive tenders, which is easily readable from the cab of the locomotive. Another object is to provide a simple device for this purpose which can be placed in the tank and is connected to a gauge which may be placed at any desired point outside of the tank. Other objects will appear from the following description.

The invention consists in the several novel features hereinafter set forth and more particularly defined by the claim at the conclusion hereof.

Figure 1:
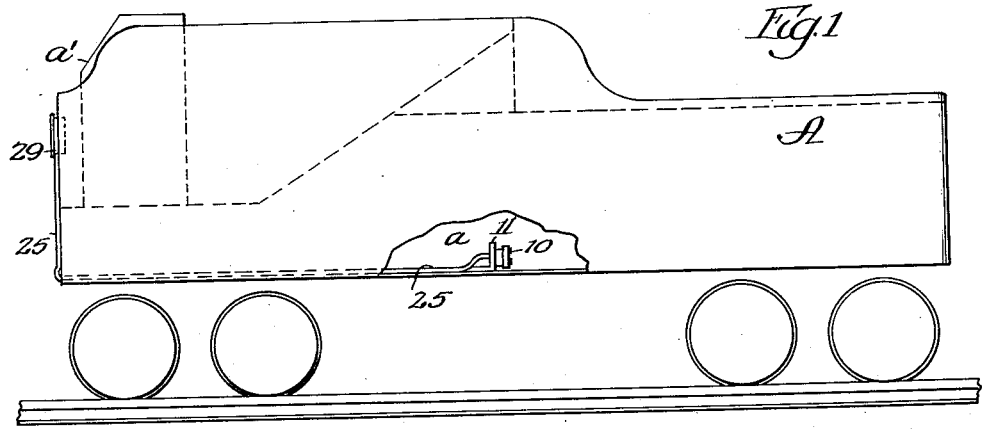
Figure 2:
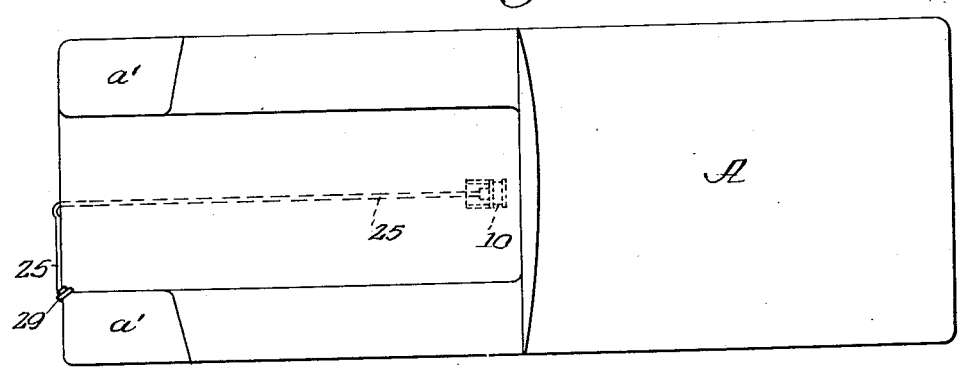
Figures 3, 4:
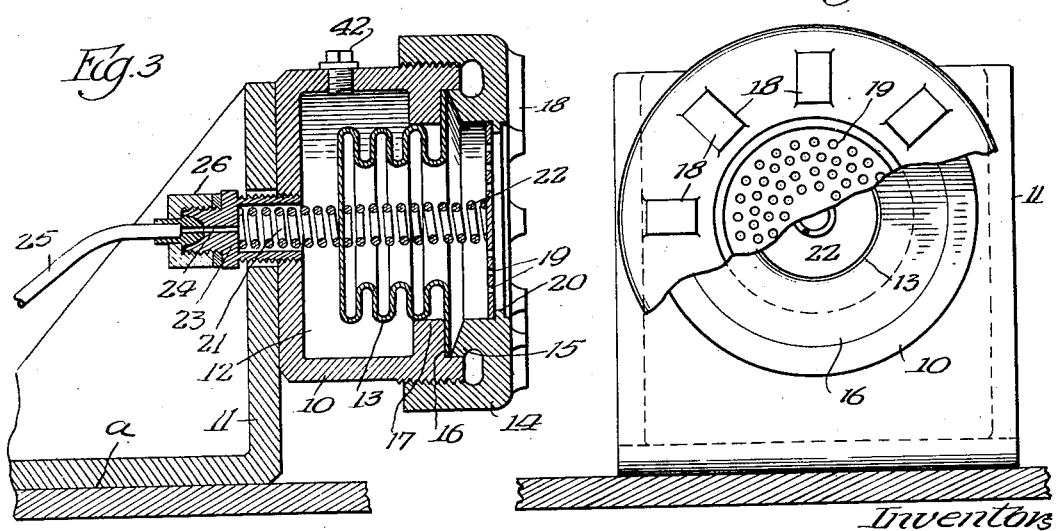

In the drawings: Fig. 1 is a side elevation and Fig. 2 is a plan of a locomotive tender equipped with a device embodying the invention. Fig. 3 is a section of that part of the device which is pressure-operated and is adapted to be immersed in the tank. Fig. 4 is an end view of the pressure-operated part, portions being broken away for purposes of illustration. Fig. 5 is a front elevation and Fig. 6 is a vertical section of the gauge part of the device. Fig. 7 is a section taken on the line 7—7 of Fig. 6.

The invention is exemplified in connection with a locomotive tender A which is provided with a water-tank $a$ having the usual water-legs $a'$ at the front thereof. The device which forms the subject matter of the invention comprises a casing 10 which is placed in and near the bottom of the water-tank $a$, and is supported by a bracket 11. The latter is secured in any suitable manner to the bottom of the tank. The casing 10 is provided with a cylindrical chamber 12 which is adapted to contain a suitable indicating-liquid, such as non-expansible oil, separately from the water in the tank in which the casing is submerged. A diaphragm 13 in the form of an annularly corrugated metallic bellows closes one side of chamber 12 and is expansible to control the volume of oil in said chamber. A head 14 is screw-threaded to one end of the casing, and is provided with a flange 15 for clamping the margin 16 at the outer end of the diaphragm against an annular seat or shoulder 17 which is integrally formed with the casing. Head 14 has an opening in its outer end to permit water in the tank to pass to the diaphragm, so that the latter will be operable by and responsive to the hydrostatic pressure of the water in the tank. As a result of this arrangement, variations in the volume of water in the tank will correspondingly expand or contract the diaphragm, according to the hydrostatic pressure of the water. This operation of the diaphragm will proportionately control the capacity or volume of the liquid in chamber 12 responsively to the fluctuations of the volume of water in the tank $a$. Lugs 18 are formed on the head 14 so it may be turned onto and off the casing in assembling the device, or when repair or replacement of the diaphragm is necessary. A strainer 19, consisting of a perforated brass plate, is seated against an annular shoulder 20 on the head 14, to prevent substances which might injure the diaphragm from being impacted against or reaching it. A coil spring 21 bears against the inner face of the diaphragm and a coil spring 22 is interposed between the outer side of the diaphragm and strainer 19, to retain yieldingly the diaphragm in its normal predetermined position according to the scale on the gauge hereinafter described. Spring 21 serves to retract the diaphragm when the pressure of the water decreases and spring 22 serves as a counterbalance when the diaphragm is in its normal position.

A nipple 23 passes through bracket 11, is screw-threaded into the end wall of the casing 10, and has a port 24 in communication with chamber 12 so the liquid in said chamber can flow through said nipple into a pipe 25. Said pipe is preferably formed of copper tubing and is connected to the nipple by a screw-coupling 26. It leads to a nipple 27, to which it is connected by a screw-coupling 27$^a$. Nipple 27 is screw-threaded to the bottom wall 28 of a housing 29 for a glass or gauge tube 30. The lower end of this tube extends into nipple 27, and packing 27$^b$, held in the nipple by a gland 27$^c$, prevents leakage of oil around the lower end of the tube. The upper end of tube 30 extends into a nipple 31 which is threaded to the top wall 32 of housing 29 and a plug 33 is threaded into said nipple to hold packing 34 around the tube. This plug is formed with a small vent-hole 35, to admit air to the top of the column of the indicating liquid. Housing 29 is formed with a slight opening 36 through which the height of the liquid in tube 30 will be visible, and with a scale 37 for the volume of water or height of the water column in the tank $a$, according to the height of the indicating liquid in the tube 30. This housing is preferably formed of sheet metal and has vertical side-flanges 38 which are secured by screws 39 to a plate 40. The latter is shaped to conform, and is welded to, an inner corner of the wall of one of the water legs $a'$. The housing is thus adapted to support the gauge on the outside of the water tank and on the tender at a point where it will be conveniently visible to the engineer in the cab of the locomotive to which the tender in coupled. An opening which is normally closed by a screw-plug 42 is provided in casing 10, to permit the air to be exhausted from said casing when filling the device with indicating liquid.

In operation, the diaphragm 13 will be operated by, and according to, the hydrostatic pressure of the water in the tank $a$. When the tank is full, this pressure will expand the diaphragm so it will displace a proportionate quantity of the indicating liquid from chamber 12, and force it through pipe 25 into the gauge glass 30, so the scale 37 will show the volume of water in the tank $a$. As the volume of water in the tank $a$ decreases, the hydrostatic pressure against the diaphragm decreases accordingly. This causes the diaphragm to contract and a proportionate amount of the indicating liquid will flow back into chamber 12, which will correspondingly lower the height of the column of liquid in glass tube 30 so that the height of said column will at all times indicate the volume of water in the tank.

The invention exemplifies a water-indicating device which is applicable to tenders, so the engineer may at all times readily, safely and easily ascertain the volume of water in the tank.

The invention is not to be understood as restricted to the details set forth, since these may be modified within the scope of the appended claim, without departing from the spirit and scope of the invention.

Having thus described the invention, what we claim as new and desire to secure by Letters Patent, is:

A gauge device for indicating the amount of liquid in a tank, comprising a casing adapted to be immersed in the bottom portion of the liquid in the tank and comprising a cylindrical side wall and a cross wall at one end of the side wall, an imperforate diaphragm of the bellows type disposed within the other end of the side wall, a ring-shaped member for clamping the margin of the diaphragm to said other end of the side wall, the liquid in the tank being adapted to pass to the diaphragm through the opening in the ring-shaped member, a perforated strainer disposed in said opening in the member and operative to strain the liquid as it passes through the opening, a liquid body in the space within the casing that is defined by the inner faces of the side wall, cross wall and diaphragm, said liquid body being adapted to be displaced by movement of the diaphragm, a pipe leading from the aforesaid space for accommodating the displaced portion of the liquid body, an indicator device connected to the pipe and operated by the displaced portion of the liquid body in the pipe to indicate the amount of liquid in the tank, a spring disposed in the space for the liquid body and applied to the diaphragm, and a second spring between said diaphragm and the strainer.

FRED. K. MURPHY.
RAYMOND W. RETTERER.
FRANK K. MITCHELL.